United States Patent [19]

Morris

[11] 3,848,479
[45] Nov. 19, 1974

[54] INTEGRAL ADJUSTMENT CLUTCH FORK
[75] Inventor: George R. Morris, Livonia, Mich.
[73] Assignee: Ford Motor Company, Dearborn, Mich.
[22] Filed: Nov. 5, 1973
[21] Appl. No.: 413,001

Related U.S. Application Data
[62] Division of Ser. No. 278,676, Aug. 7, 1972, Pat. No. 3,800,929.

[52] U.S. Cl.................... 74/522, 192/111 A, 403/4, 403/115
[51] Int. Cl............................................. G05g 23/02
[58] Field of Search ....... 74/522; 192/111 A; 403/3, 403/4, 115

[56] References Cited
UNITED STATES PATENTS
3,146,766  9/1964  Fairchild........................... 74/522 X
3,462,079  8/1969  Demi............................... 74/522 X Primary Examiner—Samuel Scott
Assistant Examiner—F. D. Shoemaker
Attorney, Agent, or Firm—Joseph W. Malleck; Keith L. Zerschling

[57] ABSTRACT

Linkage having integral slack adjustment gauge for use particularly with a clutch-operating fork actuated by flexible or rigid force links connecting to a manually operated pedal. The integral gauge has spaced seats of differential depths relative to the actuating link so that a shift of engagement from one seat to the other changes the stroke of the force link thereby providing a predetermined free travel for said pedal.

2 Claims, 4 Drawing Figures

INTEGRAL ADJUSTMENT CLUTCH FORK

This is a Division of application Ser. No. 278,676, filed August 7, 1972, now U.S. Pat. No. 3,800,929.

SUMMARY OF THE INVENTION

With present methods of assembly of clutches used in automotive vehicles, flexible linkage (or rigid linkage) connecting the foot pedal with a typical clutch fork is tightened for operation by (a) pulling the fork to a solid contacting position of the clutch, (b) snugly pulling the linkage (connecting with the fork) to eliminate slack, and (c) locking the linkage and fork in such snugged position by suitable means, such as a threaded stop for the adjustable linkage housing. During this snugging operation, a mechanical gauge in the form of an independent spacer is temporarily inserted between mechanical stops determining a predetermined position of the linkage housing and thereby the travel of the linkage; it is then removed. There may be as many as six gauges required by an installer to accommodate the various types of vehicle clutches passing his assembly station.

Certain disadvantages arise from such a method, namely: (a) the installer must use his discretion in deciding which independent gauge to place between mechanical stops for obtaining the correct clutch freeplay. This is time consuming and is subject to error if the discretionary choice by the installer is wrong; (b) should repair be required of the particular clutch after the vehicle has been in service, the repairman again must resort to his particular discretion in choosing the appropriate gauge when reassembling the clutch device allowing for additional error.

Accordingly, it is the primary object of this invention to provide a linkage which has an integral gauging means operable by a simple movement of the installer during completion of the linkage snugging connection, or automatically by the driver when the clutch is actuated for the first time. Particular features pursuant to this primary object is the provision of a gauged beam operable between two reciprocal members, the gauged beam having a pair of semi-spherical seats spaced longitudinally along the beam and having differential depths. One of the reciprocal members must engage one of the seats; a shift of the engagement from one seat to the other will change the movement of said reciprocal member a predetermined amount, normally equivalent to the amount of free pedal play desired.

DETAILED DESCRIPTION

Figure 1:
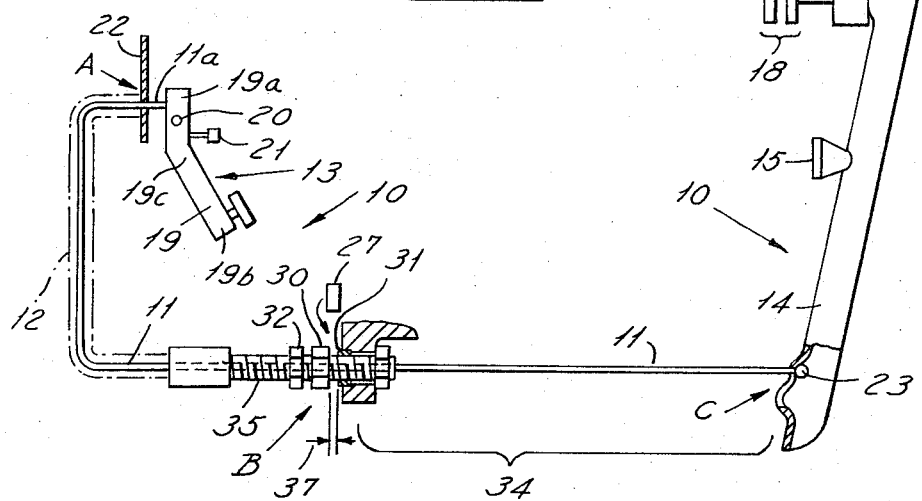
FIG. 1 is a schematic illustration of a clutch assembly having a gauged beam device in conformity with this invention.

Turning now to FIG. 1, there is illustrated a preferred embodiment, the clutching assembly or system 10 is adapted to operate with a flexible cable linkage 11 movable in a cable housing 12 connecting one end of a manually operated clutch pedal means 13 and one end of a clutch operating fork 14. The clutch operating fork may typically operate by pivotal or arcuate movement against fulcrum 15 defined on the clutch housing or equivalent and connect with a clutch bearing 16 which in turn is connected to a pressure plate 17 forming one part of a friction means 18. Suitable spring means may be employed to maintain the friction elements normally engaged; the actuating mechanism here illustrated is used to disengage and overcome the forces of the spring means.

The manually operated pedal means may comprise a pivotal clutch pedal arm 19 journaled about an axis 20, the upper portion of the arm 19a having a suitable connection to one end 11a of the cable 11. The other end 19b of the arm carries a pedal for manual actuation. A pedal stop 21 is mounted on a fixed member adapted to contact an intermediate portion 19c of the arm so as to prevent its return rotation, here counterclockwise as shown in FIG. 1 as urged by resilient means (not shown). The cable housing 12 is fixed between points A and B so as to define a predetermined cable path, point A being on a typical fire wall 22 adjacent the clutch pedal mounting and point B being on a portion 26 forming part of the housing for the friction clutch means or flywheel.

Figure 2:
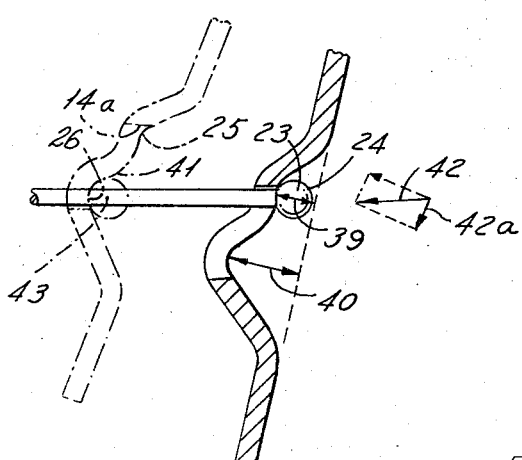
FIG. 2 is an enlarged view of a portion of FIG. 1 showing the gauged beam device in alternative operating positions.

The cable may be connected by a swivel element 23 disposed on the remote side of the fork 14 with the cable passing thru slotted opening 14a in the fork narrower than element 23 (see FIG. 2); the element 23 has an outer surface 24 complementary in shape to contact surface 25 carried on the clutch fork, contact surface 25 being one of a pair of contact surfaces, including contact surface 26, which cooperate in providing an automatic gauge for introducing free play to the flexible linkage movement.

With normal methods of assembly during installation of original equipment on an automobile, the clutch linkage 11 is snugged up tight by adjustment of cable housing 12. In this condition, with the first contact surface 25, the clutch fork being pivoted into tight engagement with bearing 16 maintained in a forward position with friction elements engaged, and the clutch pedal is in engagement with the pedal stop 21. In the snugged position, the clutch fork has no free movement. An independent mechanical gauge 27 is inserted according to the arrow in FIG. 1; the gauge may vary from one-fourth of an inch and greater. It is placed between the adjusting nut 30 and the abutting surface 31 at point B (the adjusting nut is threadably carried on threaded section 35 which is free to assume a new position relative to surface 31 as limited by nut 30). The lock nut 32 is then fastened or run up tightly against the adjusting nut 30 to lock it in place with a predetermined amount of spacing 37. The gauge is then removed. In effect this changes the length of the path of the cable between points A and B when section 35 shifts, thereby introducing an amount of slack between B and the contact point C on the clutch fork (equivalent to a reciprocal member 34) commensurate with the spacing of the independent gauge. The appropriate amount of spacing is critical and may be designed differently for each clutch system passing an installer's station. Accordingly, there may be as many as 6 gauges required and a high degree of discretion must be exercised by the installer to insure the accuracy and proper performance.

This invention contemplates the provision of integral gauging means C defined in a beam such as the clutch fork 14 operating between reciprocal members such as the clutch bearing 16 on the one hand and a portion of the flexible linkage designated 34. The two contact surfaces 25 and 26 defined on the beam are adapted to differentially position the contacting element 23 at different depths 39 and 40 taken in a transverse direction of the beam. In the embodiment of FIG. 1, the first and second contact surfaces 25 and 26 are semi-spherical and interconnected by the transition ramp 41 having an inclination relative to the longitudinal extent of the beam. Thus, during the initial assembly step (pre-installation condition) whereby the linkage is adjusted out "solid", the engaging element 23 is stationed in the first seat against the first contacting surface 25 thereby determining a first "effective length" for linkage 11. All that is necessary to incorporate a fixed amount of free play in the linkage portion 34 (operative compensated condition), is to manually shift the contacting element 23 to the second engaging surface 26 thereby assuming the shifted position, or the installer may actuate the clutch pedal thereby pivoting the clutch fork 14 to a predetermined angular position (see FIG. 2) whereby a component 42a of force 42 of the cable passing through the center 43 of the spherical contacting element 23 is effective to urge element 23 over the ramp 41 and cause the element to shift from the first seat to the second seat. This determines a second "effective length" for linkage 11.

Figure 3:
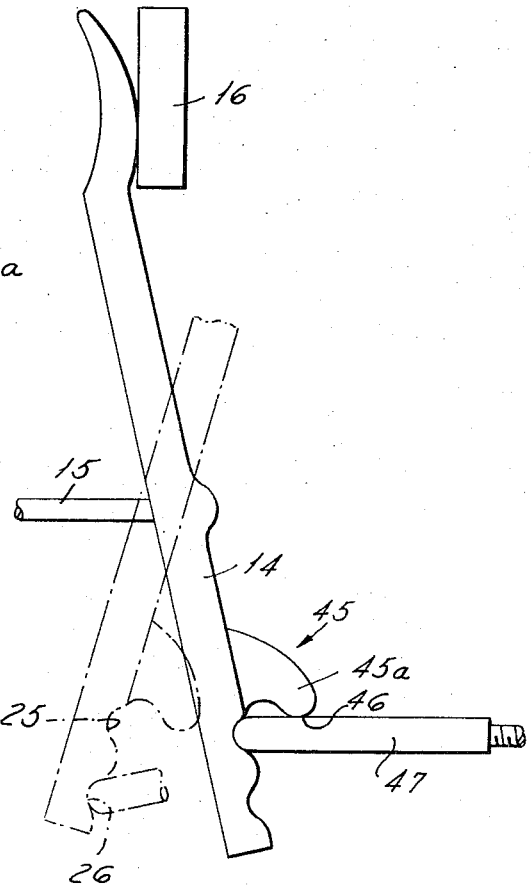
FIG. 3 is a view similar to that of FIG. 2 disclosing an alternative embodiment.

If the angular travel normally experienced by the clutch fork is relatively small and it appears difficult to incorporate a ramp angle sufficient to allow the spherical element to slidably shift as a result of clutch actuation alone, a positive actuating mechanism 45 may be incorporated on the clutch fork (beam) such as shown in FIG. 3. Here a finger 45a is employed which has a shoulder 46 arranged to contact one side of the linkage, here a solid reciprocal compression member 47, so as to urge it in a direction downwardly of the beam and shift to the adjacent seat.

Figure 4:
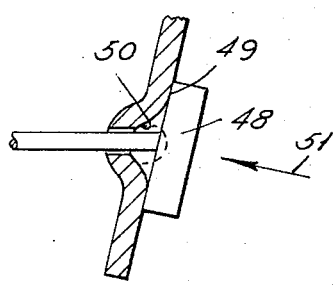
FIG. 4 is a view similar to that of FIG. 2 disclosing still another embodiment with alternative operating positions.

Turning now to FIG. 4, longitudinal displacement or shifting of a different contacting element 48 is provided by rotary movement. In this embodiment, element 48 is comprised of a cylinder adapted to engage a first surface 49 of the beam (here it is flat, but it can be a groove) when aligned with the longitudinal extent of the beam; a second contact surface defined as a cylindrical groove 50 (second seat), is disposed to intersect at right angles with the disposition of element 48 in the first position when viewed in the direction of arrow 51. Thus, the installer merely rotates the cylindrical contacting element 48 so as to allow it to shift from surface 49 (first seat) to the second seat, the surfaces having differential depths taken relative to the beam (along arrow 51) to achieve the required amount of spacing for desired free-play.

I claim as my invention:

1. Linkage having an integral adjustment gauge comprising:

a. means defining an arcuately movable first member; and b. means defining a reciprocal second member, one of said members having at least two contact surfaces, the first surface being arranged for a pre-installation condition of said linkage when said first surface and other member is interengaged thereby defining a first effective length for said other member, and the second surface being arranged for a post-installation and operative compensating condition of said linkage when said second surface and other member is subsequently interengaged thereby defining a second effective length for said other member, each of said contact surfaces comprising a semi-spherical seat spaced longitudinally along said first member, said reciprocal second member carrying an element having a surface for complimentary engagement with said contact surfaces whereby in the pre-installation condition said element is in engagement with the contact surfaces closest to the center of movement of said first member, and in the post-installation compensated condition, said element is in engagement with the other of the contact surfaces most remote from the center of movement of said first member.

2. Linkage as in claim 1, in which a ramp interconnects said seats having a predetermined inclination, and said reciprocal second member carrying an element having a surface complementary to said seats whereby upon a predetermined degree of arcuate movement of said first member the line of force through said reciprocal member exceeds the inclination of said ramp to urge said element from said first seat to said second seat.

* * * * *